INVENTOR.
JOHN H. WEGGELAND
BY
C. L. Stratton
ATTORNEY

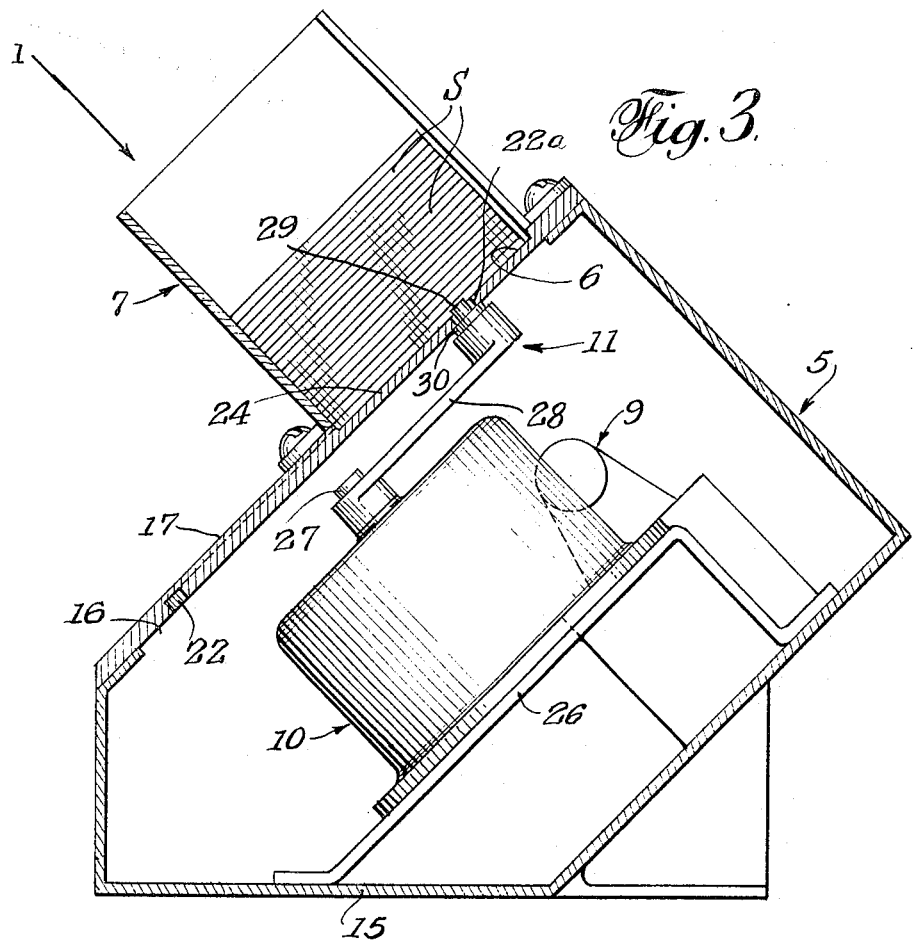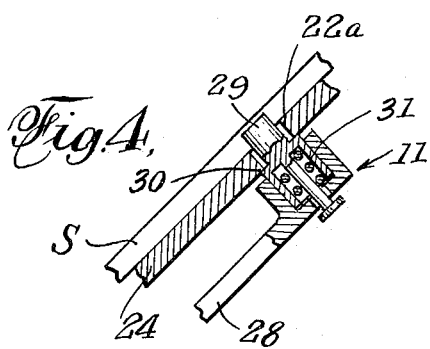

United States Patent Office 3,284,937
Patented Nov. 15, 1966

3,284,937
SLIDE VIEWER
John H. Weggeland, Los Angeles, Calif., assignor to Better Engineering, Inc., Hollywood, Calif.
Filed Aug. 10, 1964, Ser. No. 388,544
6 Claims. (Cl. 40—78)

This invention relates to a device for feeding transparency slides intermittently from a stack thereof to and then beyond a viewing station.

An object of the present invention is to provide a slide viewer, as above characterized, that, while being motor driven in a continuous manner, provides an intermittent feed that affords viewing time at the viewing station.

Another object of the invention is to provide a slide viewer, as above, in which the motor drive is of simple nature in that it includes a closed path of movement of a slide-engaging and -moving member, the same moving a slide from the bottom of the stack to the viewing station during part of said movement path, and the slide remaining in the latter position during continued movement of the moving member until the same engages the next slide at the bottom of the stack to move the same to the viewing station, the latter slide displacing the previous slide from the viewer.

This invention also has for its objects to provide such means that are positive in operation, convenient in use, easily installed in a working position and easily disconnected therefrom, economical of manufacture, relatively simple, and of general superiority and serviceability.

The above objects are realized in a construction in which the front face of the viewer is provided with a slideway along which transparency slides are moved from the bottom of a stack thereof, first to a viewing station and, then, from said station off the side of the viewer, and with a continuously operating electric motor (or other prime mover) that is geared for slow movement of an arm on the output of said motor and which is provided with a drive dog that moves in a closed path (preferably circular) to engage an edge of the bottom slide of the stack and move it to the viewing station. The dog loses engagement with the slide at the latter station, the slide remaining there until the dog engages and moves the next bottom slide from the stack to the viewing station. The second slide, during the latter part of its movement, engages and displaces the first slide so the same falls off the side of the viewer where the same may be re-stacked.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 3 is a vertical sectional view as taken on the line 3—3 of FIG. 1.

FIG. 4 is a fragmentary and enlarged sectional view of a slide-moving member used in the present slide viewer.

Figure 1:
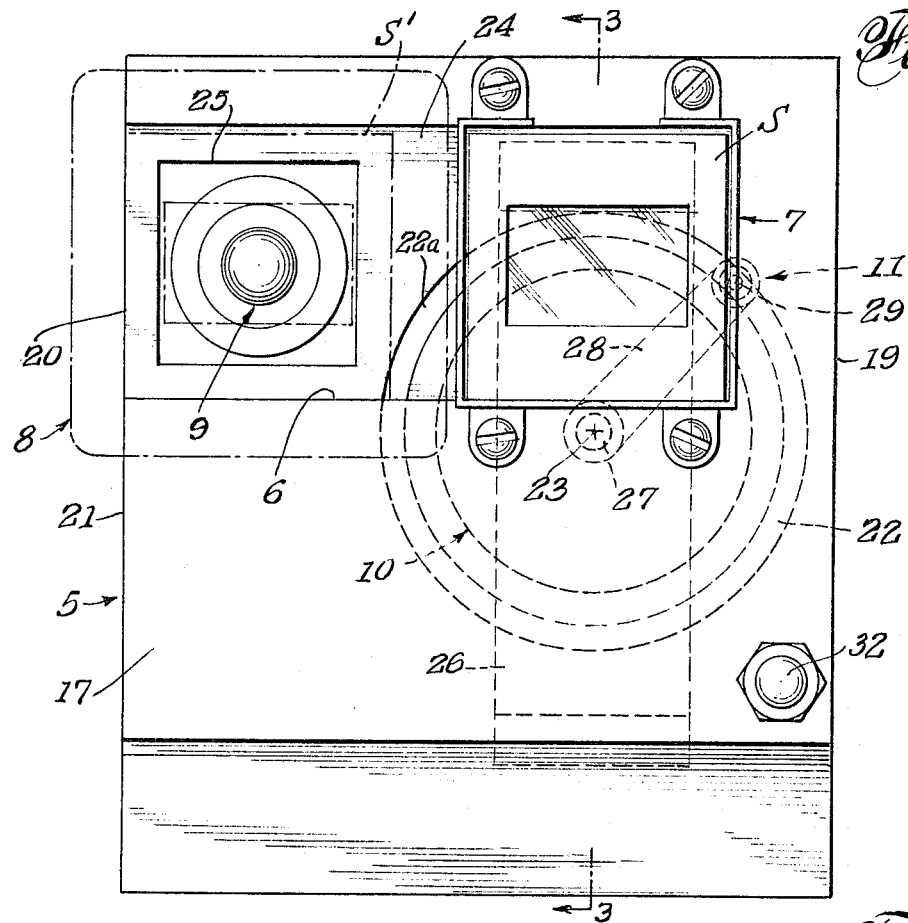
FIG. 1 is a top plan view of the sloping top of the viewer, as viewed in the direction of the arrow 1 of FIG. 3.

The viewer that is illustrated comprises, generally, a housing 5, a slideway 6 for transparency slides S, a magazine 7 at one end of the slideway to hold a stack of slides above and resting upon said slideway, a viewing station 8 at the opposite end of the slideway with means 9 disposed in the housing to illuminate a slide at said viewing station, a geared motor 10 within the housing, and means 11 continuously driven by said motor and moving in a path to engage an edge of the bottom slide in a stack thereof in the magazine 7, push the same to the viewing station and, then, lose engagement with the slide so the same remains at the viewing station while said means 11 continues its path of movement toward the stack to engage the next bottom slide of the stack and move the same as before.

The housing 5 is provided with a base 15 and has a preferably sloping front opening 16 that is closed by a top plate 17 that is preferably at a 45° angle, as in FIG. 3. The motor 10 and the illuminating means 9 are disposed within said housing.

Figure 2:
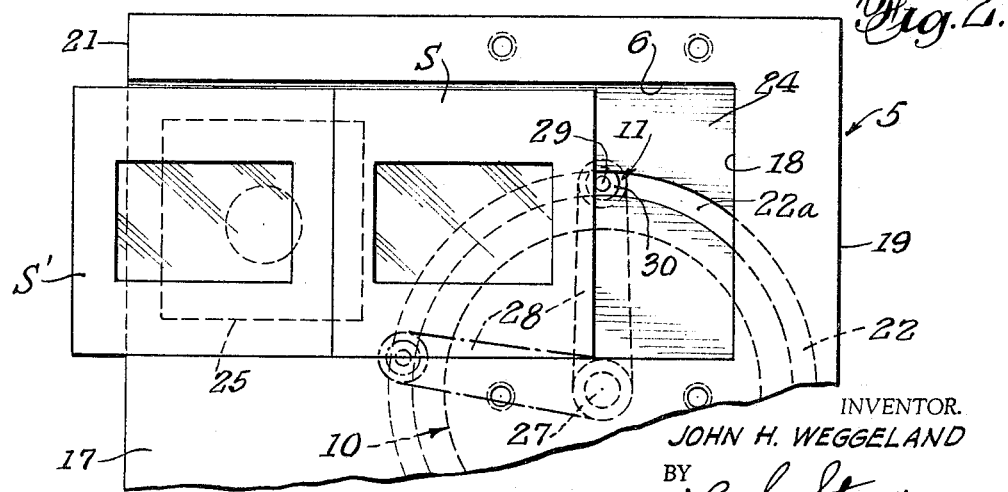
FIG. 2 is a fragmentary plan view of said top with the stacking magazine omitted and the parts in the process of feeding a transparency slide toward the viewing station and displacing the previous slide from said station.

The slideway 6 is formed in the top face of the plate 17 and extends from a closed end 18 near one side 19 of the housing to an open end 20 at the opposite side 21 of said housing. Said slideway is of a depth, as shown in FIG. 3, to accommodate and guide a transparency slide S for movement from a position adjacent the closed end 18, outwardly off the open end 20. FIG. 2 shows two slides S and S' in the process of being so moved.

A circular groove 22 is formed in the under face of the plate 17, the same being generated on a center 23 that is off the slideway, extends through the bottom wall 24 of the slideway to form a slot 22a and partly through the plate 17. Said slot 22a, portion of the groove 22, is shown as comprising approximately one-third of the circumferential extent of the entire groove, although the same may be differently proportioned in order to provide a ratio of slide-feeding time and slide-viewing time, as desired.

The magazine 7 may be of any suitable design so that the same may hold a stack of slides S, as shown in FIGS. 1 and 3, so the same, although at an angle of 45°, gravitationally feeds the slides, one by one, onto the bottom wall 24. Said magazine overstands the slideway and its lower portion is so spaced therefrom that the bottom slide of a stack will freely move toward the open end 20 of the slideway.

The viewing station 8 is shown in dot-dash lines merely to show its approximate position, since the same, per se, forms no part of this invention. Any suitable magnifying assemblage may be used for viewing a slide in position over and in general register with an opening 25 in the slide wall 24 and through which light from the means 9 reaches such a transparency slide. Said means 9, also, per se, form no part of the present invention and may be conventional of viewing-station illuminating means.

The geared motor 10 is shown as mounted on a bracket 26 so that its output shaft 27 is on the center 23 and is directed toward the plate 17 of the housing. The means 11 is mounted on said shaft. In practice, the speed of shaft 27 may be reduced by the gearing of the motor to a revolution of several seconds so that the means 11 may use one-third of said time to move a slide, the remaining two-thirds being the time that the slide remains in viewing position and the means 11 is moving to engage the next slide of the stack to feed the same.

The means 11 is shown as an arm 28 on shaft 27, a feed dog 29 carried by the end of said arm and extending through the slot portion 22a to a height less than the thickness of a slide S but sufficient to engage the same to push against the lower or bottom slide and feed the same toward the viewing station. A shoulder 30 on said dog 29 engages the under face of the plate or panel 17 to limit the projection of the dog, a spring 31 imposing a light bias on the dog in an upward direction.

It will be clear that the dog 29 has a circular path or any other path that would move the same in continuous revolutions around the center 23 and that only where it projects through the slot portion 22a does it engage a slide, move it, and then lose it. Also, it will be clear from FIG. 2 that the slide S being fed to viewing position displaces a slide S' that was moved to said position by the previous movement of the means 11.

The motor 10, of course, is provided with the usual operating circuit, the push button switch 32 representing means for opening and closing the circuit to the motor to start and stop the feed operation. If longer viewing time is wanted for any slide at the viewing station, it can be had merely by pressing said button 32 to stop the motor. The circuit to the illuminating means 9 will remain closed, a separate control switch being provided therefor.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A slide viewer comprising:
   (a) a top having a slideway with a bottom wall adapted to support a stack of transparency slides at one end thereof,
   (b) a viewing station being provided at the other end of the slideway, and
   (c) motor-driven means to push the bottom slide of said stack along the slideway to the viewing station and leave the slide thus moved,
   (d) said means comprising a member that is moved by the motor in a closed, continuously circular path, the slide being engaged and pushed by said member during part of said movement and the member, during the remainder of its movement, moving toward the next bottom slide of the stack to push the same, while the slide at the viewing station is at rest.

2. A slide viewer according to claim 1 in which the bottom wall of the slideway has a circular groove, and the slide-pushing member extends therethrough into slide engagement.

3. A slide viewer comprising:
   (a) a top having slideway with a bottom wall adapted to support a stack of transparency slides at one end thereof,
   (b) a viewing station being provided at the other end of the slideway, and
   (c) motor-driven means to push the bottom slide of said stack along the slideway to the viewing station and leave the slide thus moved,
   (d) said means comprising a member that is moved by the motor in a closed path, the slide being pushed during part of said movement, and the member, during the remainder of its movement, moving toward the next bottom slide of the stack to push the same, while the slide at the viewing station is at rest,
   (e) the bottom wall of the slideway having a groove, and the slide-pushing member comprising a rotational arm provided with a dog on the end thereof and extending through said slot into slide engagement.

4. A slide viewer according to claim 3 in which resilient means is provided to bias the dog in a direction to extend through said slot.

5. A slide viewer comprising:
   (a) a top having a slideway with a bottom wall adapted to support a stack of transparency slides at one end thereof,
   (b) a viewing station being provided at the other end of the slideway,
   (c) said bottom wall of the slideway being provided with a slot,
   (d) a geared motor having a slow-turning output shaft, and
   (e) an arm on said shaft with its free end movable in a circular path around the axis of the shaft and provided on said free end with means to engage and push a slide, during part of the movement of the arm, from the bottom of said stack along the slideway to the viewing station and there to lose pushing contact with said slide for the remainder of the movement of the arm in said circular path.

6. A slide viewer comprising:
   (a) a top having a slideway with a bottom wall adapted to support a stack of transparency slides at one end thereof,
   (b) a viewing station being provided at the other end of the slideway, and
   (c) rotatable means arranged to travel in a single, circular direction to push the bottom slide of said stack along the slideway to the viewing station and to push the next slide from the bottom of the stack to the viewing station, the latter slide ejecting the next previous slide from the viewing station,
   (d) the bottom wall of the slideway having a circular groove extending below the upper surface of the slideway, and the rotatable means including dog means that travels in said groove and extends above said surface into slide-engaging position.

References Cited by the Examiner
UNITED STATES PATENTS 2,594,162  4/1952  Hartley _____ 40—78 X
2,814,965  12/1957  Lacoe _____ 40—78 X
2,849,814  9/1958  Rideout _____ 40—78

EUGENE R. CAPOZIO, *Primary Examiner*,

W. GRIEB, *Assistant Examiner*,